May 27, 1947. H. W. KLINE Re. 22,884

RADIO TRANSMISSION SYSTEM

Original Filed Feb. 21, 1941 2 Sheets-Sheet 1

Inventor:
Halsey W. Kline,
by Harry E. Dunham
His Attorney.

RADIO TRANSMISSION SYSTEM

Original Filed Feb. 21, 1941 2 Sheets-Sheet 2

Inventor:
Halsey W. Kline,
by Harry E. Dunham
His Attorney.

Reissued May 27, 1947 Re. 22,884

UNITED STATES PATENT OFFICE 22,884

RADIO TRANSMISSION SYSTEM

Halsey W. Kline, Schenectady, N. Y., assignor to General Electric Company, a corporation of New York Original No. 2,334,011, dated November 9, 1943, Serial No. 380,021, February 21, 1941. Application for reissue January 29, 1947, Serial No. 724,939

14 Claims. (Cl. 250—6)

This invention relates to a signal transmission system, and more particularly to a carrier wave system for transmitting signals in which fading is minimized or eliminated.

In the art of radio communication it is well known that a radio wave of medium or high frequency often cannot be received within a zone which may, for example, lie (for a 20 meter wave) between 50 and 700 miles from the transmitter. In other words, under a certain set of conditions, the wave may, for example, be received only within 50 miles of the transmitter, or farther than 700 miles from it. The width of such a zone in which the transmitted wave cannot be received is commonly termed the "skip distance." It is usually assumed that this skip exists because a radio wave from a transmitter moves near the ground only for a short distance before it becomes attenuated to an intensity too low to be received, while ionized layers in the upper atmosphere reflect the wave from the transmitter to positions much farther removed than those to which the ground wave reaches. Varying reflection from the ionized layers produces fading.

It is an object of my invention to provide an improved signal transmission system by which communication may be carried on at distances from the transmitter within the normal "skip distance."

It is also an object of my invention to provide an improved signal transmission system in which fading effects are minimized.

To attain these objects I utilize a system in which a radio wave, for example, is radiated in such a way that a directional characteristic may be changed. If the radiation is in the form of a beam, the direction of propagation of the beam may be altered periodically. As the beam direction is periodically altered, reflection from the ionized layers varies in direction and position, so that many points not reached by a wave propagated in a single direction are reached intermittently by such radiation whose direction of propagation is altered. Alternatively, a polarized wave may be radiated and the direction of polarization altered intermittently to produce similar results.

When either of these directional characteristics is altered, the intensity of radiation is preferably kept constant, whereby fading is reduced at distant points to which such radiation is reflected from upper strata of the atmosphere. In particular, selective fading, due to unequal transmission of side bands, is lessened.

It is accordingly a particular object of my invention to provide an improved signal transmission system for transmitting a signal over a carrier wave whose amplitude and frequency are maintained constant at all times.

Figure 1:
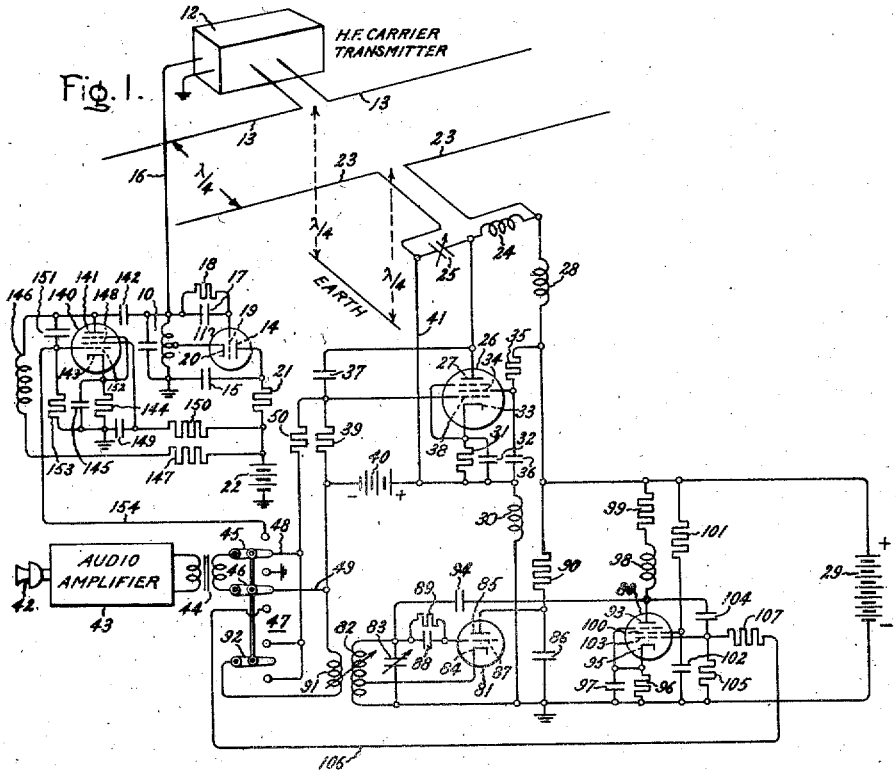
Figure 2:
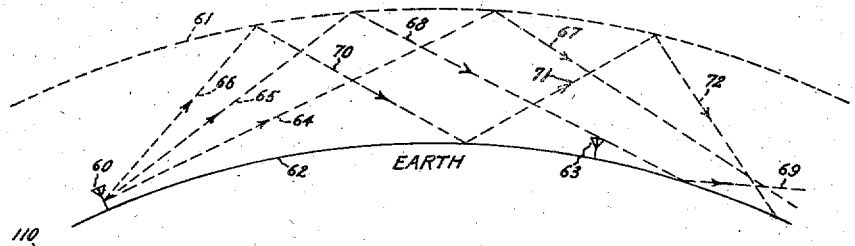
Figure 3:
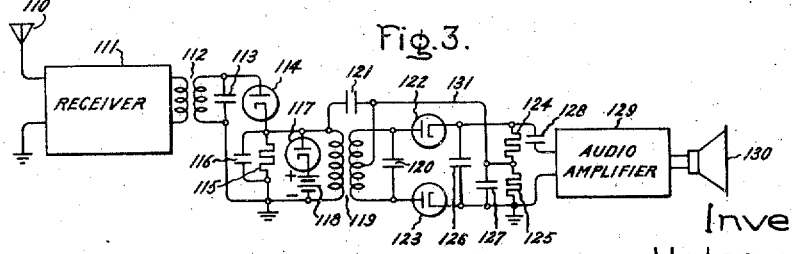
Figure 4:
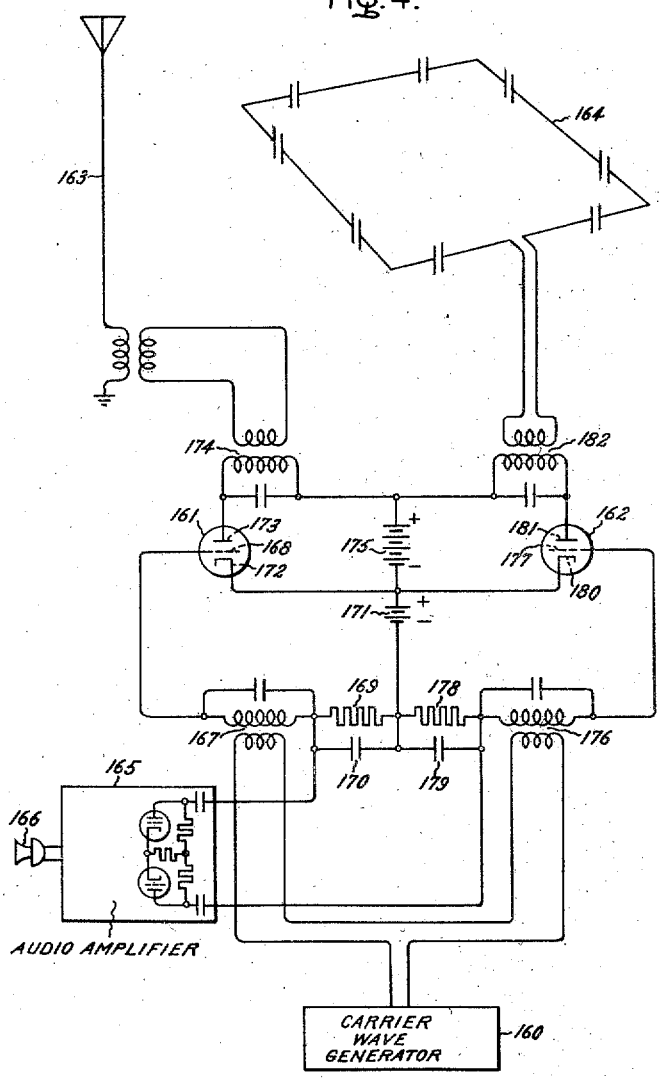

The features of my invention which I believe to be novel are set forth with particularity in the appended claims. My invention itself, however, both as to its organization and method of operation, together with further objects and advantages thereof may best be understood by reference to the following description taken in connection with the accompanying drawings in which Fig. 1 illustrates a radio transmitter constructed according to my invention in which the direction of propagation of a radio beam is altered; Fig. 2 illustrates certain characteristics of my signal transmission system; Fig. 3 illustrates a receiver for receiving waves from the transmitter illustrated in Fig. 1; and Fig. 4 illustrates a form of my invention in which the polarization of a wave is altered.

In Fig. 1 the transmitter includes a tuned circuit 10, which is maintained in oscillation by an electron discharge device 11, and from which oscillations are amplified in a high frequency carrier transmitter 12 and radiated from a dipole antenna 13. One terminal of the tuned circuit 10 is grounded and is coupled to the anode 14 of the device 11 through a coupling condenser 15. The other terminal of the tuned circuit 10 is connected through a conductor 16 to the transmitter 12 and is coupled through a condenser 17, shunted by a resistance 18, to the control electrode 19 of the device 11. The cathode 20 of the device 11 is connected to an intermediate point of the tuned circuit 10. The anode 14 is connected through a resistance 21 and source 22 of operating potential. The tuned circuit 10 and accompanying elements thus form a usual type of oscillator.

The dipole antenna 13 lies parallel to the surface of the earth and at a distance above the surface of the earth equal to one-quarter wave length of the wave impressed on the antenna. A similar dipole antenna 23 is placed parallel to the antenna 13 and lies one-quarter wave length from the antenna 13 and one-quarter wave length above the surface of the earth. The dipole antenna 23 is interrupted at its center, and the interruption is bridged by a series resonant circuit comprising an inductance 24, a condenser 25, and an electron discharge device 26.

The dipole antenna 23 is arranged to act as a reflector of the waves radiated from the antenna 13. This reflecting antenna 23, by adjustment of the resonant frequency of the series resonant circuit comprising the inductance 24, the condenser 25, and the discharge device 26, may be made more or less effective to reflect radiated waves of a particular frequency. When the resonant frequency of the series resonant circuit is made equal to the frequency of waves radiated from the antenna 13, the antenna 23 is, in effect, connected together at its center so as to act most effectively as a reflector for waves from the antenna 13. When so adjusted the antenna system acts to radiate waves in a direction substantially opposite to the direction of the antenna 23 from the antenna 13.

When the resonant frequency of the series resonant circuit is adjusted to a frequency different from that of the waves radiated from the antenna 13, the reflecting antenna 23 is effectively interrupted at its center, and does not reflect waves of such frequency. When so adjusted, the antenna system radiates waves upward from the antenna 13, because of the reflecting power of the surface of the earth. Therefore, by adjustment of the resonant frequency of the series resonant circuit comprising the inductance 24, the condenser 25, and the discharge device 26, the direction, in a vertical plane, in which waves from the antenna 13 are radiated, may be adjusted.

The electron discharge device 26, which is a part of the series resonant circuit, is so connected in shunt to the condenser 25 as to transmit therearound a current whose phase leads the phase of voltage across condenser 25 by a substantial angle and which therefore simulates a condenser connected in shunt to condenser 25.

The anode 27 of the device 26 is connected to a point between the inductance 24 and one terminal of the condenser 25, and the cathode 33 is connected through a resistance 31, in shunt to a bypassing condenser 32, and a conductor 41 to the other terminal of the condenser 25. The device 26 is supplied with operating current through a circuit which may be traced from the anode 27 through the inductance 24, a choke coil 28, a source 29 of potential whose negative terminal is grounded, a choke coil 30, and the resistance 31 to the cathode 33 of the device 26. The screen electrode 34 is supplied with operating potential through a resistance 35 from the positive terminal of source 29, and is bypassed through a bypassing condenser 36 to a point between the choke coil 30 and the resistance 31.

A potential is supplied from the anode of device 26 through condenser 37 to the control electrode 38 in such phase with respect to alternating potential between the anode 27 and the cathode 33 as to cause alternating current to flow through the anode and cathode having a substantially leading phase relation to the alternating voltage therebetween. This alternating potential is impressed on the control electrode 38 through a network comprising condenser 37 and a resistance 39 and a source 40 of potential connected in series between the control electrode 38 and a point between the choke coil 30 and the resistance 31. The source 40 maintains a suitable bias potential for the control electrode 38.

Alternating potential between the anode 27 and the cathode 33 is impressed across the series combination of condenser 37 and resistance 39, whereby alternating current of leading phase flows through the condenser and resistance. Consequently, an alternating voltage of leading phase, with respect to the voltage between the anode 27 and cathode 33, is developed across the resistance 39, and applied to the control electrode 38. Alternating current which flows through the device 26 is in phase with the leading alternating potential on the control electrodes 38. Any alternating potential which exists between the anode 27 and the cathode 33 of the device 26 is, therefore, accompanied by a leading alternating current, so that the device 26 simulates a condenser.

The amount of leading current which flows through the device 26 may be adjusted by changing the potential across the resistance 39, thereby changing the apparent reactance of the device 26 in its action in simulating a condenser. As the apparent reactance of the device 26 changes, the resonant frequency of the series resonant circuit including inductance 24, condenser 25, and discharge device 26, changes with a concurrent change in the direction of maximum radiation from the antenna 13.

Audio signals from a microphone 42 are amplified in amplifier 43 and applied across the resistance 39 so as to change the direction of maximum radiation from the antenna 13 in accordance with the intensity of the audio signals to be transmitted. The output circuit of amplifier 43 includes a switch 47 having three positions and which, in the position shown, supplies the amplified signals across resistance 39 through resistance 50. Its operation when in the other of its positions will later be indicated.

The transmitter as thus described may be adjusted in several ways. The source 40 of potential may be made just large enough to make the apparent reactance of the device 26, in the absence of a signal from the microphone 42, of the proper value to make the series resonant circuit, including inductance 24, condenser 25, and discharge device 26, resonate at the frequency of waves from the antenna 13. The output of the audio amplifier 43 may then be poled in either direction, so that the apparent reactance of the device 26 either increases or decreases as the intensity of the audio signal increases. A change of reactance in either direction changes the resonant frequency of the series resonant circuit, and reduces the effectiveness of the antenna 23 as a reflector, so that the direction of radiation of the waves is changed in response to the intensity of the audio signal.

Alternatively the potential from the source 40 may be made of such value as to make the series resonant circuit resonant at a frequency removed from the frequency of waves from the antenna 13 by an amount equal to the shift of resonant frequency caused by the average peak intensity of signals from the microphone 42. Such signals of peak intensity then make the series resonant circuit resonate at the frequency of waves radiated from antenna 13.

For the reception of waves transmitted from such a transmitter an ordinary receiver adapted for the reception of amplitude modulated waves is suitable. Although the frequency and amplitude of the wave radiated from the antenna 13 are constant at all times, the method of transmission which comprises varying the direction of propagation of the radiation causes the distant receiver to receive more or less radiated energy in accordance with the intensity of the signal from the microphone 42. The received wave therefore appears to be modulated in amplitude, although it is in fact modulated in direction of propagation.

Referring to Fig. 2, there may be obtained a clearer idea of the manner in which the radiation received at the distant receiver varies as the direction of propagation is changed at the transmitter. The transmitter is represented by an antenna 60 at a certain position on the surface of the earth 62. An ionic reflection layer is represented by a dotted line 61 parallel to the surface of the earth 62. A distant receiver is represented by a second antenna 63. In the figure three different lines 64, 65, and 66 represent three different paths over which the radiation from the transmitter 60 travels at three different instants of time. The path 64 is nearly horizontal at the transmitter 60, indicating that the antenna 23 is effective as a reflector. The paths 65 and 66 are progressively nearer vertical, indicating that the antenna 23 is correspondingly less effective as a reflector.

The wave which takes the path 64 travels a long distance before being reflected from the ionic layer 61 to travel a return path 67, which reaches the earth at a point far beyond the receiver 63. The wave which travels the second path 65 reaches the ionic layer 61 at a shorter distance, and is reflected at a more acute angle along a path 68, which passes close to the receiver 63 to be reflected again from the surface of the earth 62 along a path 69. The wave which travels the third path 66 is reflected from the ionic layer 61 at a point even closer to the transmitter 60, and takes the path 70 so as to be reflected from the earth 62 at a point between the transmitter 60 and the receiver 63. After reflection from the earth, this wave takes a path 71 back to the ionic layer 61, and is again reflected therefrom along a path 72 to a point on the surface of the earth 62 beyond the receiver 63.

By consecutive inspection of these three paths of radiation travel, it may be seen that energy from the transmitter 60 reaches the receiver 63 at least once during each time the path of travel of the beam from the transmitter 60 is varied in a vertical plane. In order to avoid distortion of the signal at the receiver 63, it is desirable to adjust the angle through which the carrier wave beam is swept in the vertical plane, so that the beam passes the receiver substantially only once during each sweep. Of course, it is within the scope of the invention to sweep the beam in a horizontal, or an other, plane and similar precaution should be taken to avoid distortion.

The transmitter illustrated in Fig. 1 may be caused to operate in a different way. The beam radiated from the antenna 13 may be caused to sweep up and down in a vertical plane at a predetermined frequency when there is no signal from the microphone 42, and to sweep up and down in a vertical plane at differing frequencies for various intensities of signal from the microphone 42. To reconnect the transmitter to accomplish this, the blades of the switch 47 are moved downward to connect the output of the audio amplifier 43 through an electron discharge device 80, which controls the operating frequency of an oscillating electron discharge device 81, which in turn is connected to supply alternating potential across the resistance 39.

The discharge device 81 is connected with a tuned circuit, comprising an inductance 82 and a condenser 83, to form an oscillator and maintain continuous oscillations. The cathode 84 of the device 81 is connected to an intermediate point of the inductance 82, of which one terminal is grounded. This grounded terminal of the inductance 82 is coupled through a bypassing condenser 86 to the anode 85 of the discharge device 81, while the other terminal of the inductance 82 is coupled through a condenser 83, in shunt to a resistance 89, to the control electrode 87 of the device 81. Operating current for the discharge device 81 is supplied through a circuit which may be traced from the anode 85 through a resistance 90, the source 29, and a portion of the inductance 82 to the cathode 84 of the device 81.

Continuous oscillations maintained in the tuned circuit 82, 83 are transferred to an inductance 91, coupled to the inductance 82. There is a third blade 92 of the switch 47, through which the inductance 91 is connected in series with the resistances 39 and 50, when the switch 47 is in its downward position. The continuous oscillations produced by the oscillator comprising discharge device 81 and the tuned circuits 82, 83 are therefore effective to adjust continuously up and down the direction of radiation from the antenna 13.

The electron discharge device 80 is connected in shunt to the condenser 83 to simulate a condenser in a manner similar to the connection of the discharge device 26 in shunt to the condenser 25. The anode 93 of the device 80 is coupled through a condenser 94 to the ungrounded terminal of the condenser 83, and the cathode 95 of the device 80 is connected through a resistance 96 in shunt to a bypassing condenser 97 to ground, and so to the other terminal of the condenser 83. Operating current for the device 80 is supplied through a circuit, which may be traced from the anode 93 through a choke coil 98, a resistance 99, the source 29 of potential, and the resistance 96 to the cathode 95 of the discharge device 80. The screen electrode 100 is supplied with operating potential through a resistance 101 from the positive terminal of the source 29, and is bypassed to ground through a bypassing condenser 102.

A series combination of a condenser 104 and a resistance 105 is connected between the anode 93 and ground to impress an alternating potential on the control electrode 103 which is leading in phase with respect to the alternating potential between the anode 93 and the cathode 95. As explained in connection with the device 26, alternating voltage between the anode 93 and cathode 95 produces a leading alternating current through the series combination of condenser 104 and resistance 105, with consequent production of a leading alternating voltage across the resistance 105, which leading voltage appears between the control electrode 103 and cathode 95. By adjustment of the average voltage across the resistance 105, the amount of leading current flowing through the discharge device 80 may be adjusted with concurrent adjustment of the frequency of the continuous oscillations maintained in the tuned circuit 82, 83.

In this connection of the transmitter, the signals from the microphone 42 are applied across the resistance 105, so that the frequency of continuous oscillations maintained in the tuned circuit 82, 83 varies in accordance with the audio signals. Consequently, the frequency at which the direction of radiation from the antenna 13 is altered up and down is varied in response to and in accordance with the signals from microphone 42.

With the blades of the switch 47 in the above mentioned downward position, the blade 45 is connected to ground, and the blade 46 is connected through a conductor 106 and a resistance 107 to the control electrode 108. Amplified signals from the microphone 42, therefore, appear across the resistance 105, change the amount of leading current passing through the discharge device 80, change the frequency of the continuous oscillations maintained in the tuned circuit 82, 83, change the frequency at which the amount of leading current passing through the device 26 is changed, and consequently change the frequency at which the beam of radiation from the antenna 13 is swept up and down in a vertical plane in response to the intensity of the signals from the microphone 42.

It is preferred that the rate at which the beam is swept up and down in the absence of a signal be higher than the highest frequency of the signal which it is desired to transmit. For example, if it be desired to transmit an audio signal having frequencies extending, for example, to 10,000 cycles, it is preferred that the discharge device 81 produce oscillations having a frequency higher than 10,000 cycles, for example, of the order of 20,000 to 50,000 cycles.

An ordinary receiver designed to detect waves modulated in accordance with signals of less than 10,000 cycles, cannot respond to such a transmitted wave. As explained before, the amplitude and frequency of a transmitted wave are constant at all times, the direction of transmission being varied. A distant receiver of the ordinary type receives the carrier wave intermittently, as explained in connection with Fig. 2, but at such a high rate of speed as to be inaudible. An ordinary receiver, therefore, receives the transmited wave as a continuously radiated carrier wave with no modulation.

In Fig. 3 there is illustrated a special receiver which I have provided for reception of the wave transmitted by the transmitter illustrated in Fig. 1 when the switch 47 is in its downward position. An antenna 110 is arranged to receive the carrier wave as it passes the receiver, and to impress it upon a receiver 111, which comprises a suitable tuning and amplifying apparatus for the carrier wave. The output of the receiver 111 is supplied through a transformer 112, tuned by a condenser 113 to the frequency of the carrier wave, upon a diode detector 114 in series with a load resistance 115. A high frequency by-passing condenser 116 is connected in shunt to the load resistance 115.

When the beam is radiated from the transmitter in such a direction as to produce maximum energy at the receiver, a voltage is produced across the resistance 115 in accordance with the maximum intensity of the carrier wave at the receiver. When the beam is radiated from the transmitter in other directions such that minimum energy is received at the receiver, a minimum voltage appears across the resistance 115. The voltage across the resistance 115, therefore, corresponds to the output voltage of the tuned circuit 82, 83. The frequency of the voltage across the resistance 115 is, therefore, constant in the absence of a signal from the microphone 42, and varies in frequency from this constant frequency when a signal is transmitted from the microphone 42. The voltage across the resistance 115, therefore, has the characteristics of a frequency modulated carrier wave, except that the average frequency may be lower than radio frequencies. This average frequency is approximately the predetermined frequency at which the tuned circuit 82, 83 operates in the absence of a signal from the microphone 42, and as explained above, may be of the order of from 20 to 50 kilocycles.

A diode rectifier, or detector, 117, and a source 118 of potential, connected in series, are in shunt to the resistance 115, and act as a limiter. The potential of the source 118 is small, and is usually of the order of 1 volt. The source 118 is so poled with respect to the diode 117 as to maintain the diode non-conductive in the absence of voltage across the resistance 115. When the alternating voltage across resistance 115 has a peak value greater than the voltage of source 118, current flows in the diode 117 during such times and reduces such voltages.

The function of the diode 117 and source 118 is similar to the function of a limiter in a frequency modulation receiver. Sufficient amplification is provided in the receiver 111 so that signals are normally amplified to produce a voltage across the resistance 115 greater than the potential of the source 118. The diode 117 being conductive at all values of voltage across the resistance 115 greater than the potential of the source 118, the signal voltage which can appear across the diode 117 and the source 118 in series is limited to a constant maximum value.

A circuit is connected in shunt to the resistance 115, which circuit is arranged to respond to the deviation of the frequency of the voltage across resistance 115 from a predetermined frequency equal to the frequency to which circuit 82, 83 is tuned, and to produce a voltage whose polarity and magnitude correspond to the direction and amount of such deviation. This voltage represents the signals from the microphone 42 or the frequency of the continuous oscillations maintained in the tuned circuit 82, 83 when there is no signal from the microphone 42.

This circuit which is connected in shunt to the resistance 115 comprises a pair of diode rectifiers 122 and 123, to each of which two components of voltage are applied. One component of voltage is applied to each of the diode rectifiers 122 and 123, which component is in phase with the voltage across the resistance 115. These latter components are applied through a coupling condenser 124, connected between the center tap of a transformer 119 and a point between resistance 115 and detector 114. To the secondary of this transformer 119 the diode rectifiers 122 and 123 are connected in opposing relation through a balanced load circuit comprising a pair of series connected load resistances 124 and 125. A bypassing condenser 126 is connected in shunt to the two load resistances and a second bypassing condenser 127 is connected in shunt to the load resistance 125. These two bypassing condensers have low impedance to voltages of the frequency of the voltage across the resistance 115, but substantial impedance at the highest frequency of signal voltages from the microphone 42. The circuit is arranged so that the above-described two components, applied to the respective diode rectifiers 122 and 123, produce equal and opposite voltages across the respective two resistances 124 and 125. A conductor 131 is connected between the center tap of the secondary of transformer 119 and a point between the load resistance 124 and 125.

A second component of voltage from the resistance 115 is applied to each of the diode rectifiers 122 and 123. This second component is applied through the transformer action of the transformer 119, whose primary is connected in shunt to resistance 115 and whose secondary, shunted by a condenser 122, forms a tuned circuit. If the frequency of the voltage across resistance 115 is the same as the resonant frequency of the tuned circuit, including the condenser 120 and the transformer 119, the transformer 119 impresses a voltage on one of the diode rectifiers, which voltage leads by substantially 90° the voltage across the resistance 115. The tuned transformer applies across the other diode rectifier a voltage of equal magnitude, which voltage lags, by substantially 90°, the voltage across the resistance 115.

As the frequency of the voltage across the resistance 115 changes, this phase relation between the various components changes, so that the two components across one diode rectifier are more nearly in phase, and the two components across the other diode rectifier are more nearly out of phase. The resultant voltage across one diode, therefore, becomes greater than that across the other, when the frequency of the voltage across resistance 115 is different from the resonant frequency of the tuned circuit including the condenser 120 and the transformer 119. Under such conditions a greater rectified voltage appears across one of the load resistances 124 and 125 than across the other, and a net signal voltage is therefore present across the series combination of the two load resistances.

The signal voltage across the resistances 124 and 125 is transmitted through a coupling condenser 128 to the input of an audio amplifier 129, which amplifies the signal and transmits it to a loud speaker 130.

By further adjustment of the switch 47, the transmitter illustrated in Fig. 1 may be utilized for a third type of transmission in which the beam from the antenna 13 is swept up and down in a vertical plane at a constant rate, while the frequency of the carrier wave is modulated in response to the intensity of a signal. In this third connection of the transmitter, continuous variation of the direction of transmission of radiation from the antenna 13 assures reception at the distant receiver, as explained above in connection with Fig. 2, while modulation of the frequency of the carrier wave in response to the intensity of an audio signal provides signal transmission without selective fading associated with multi-path transmission, such as occurs with an amplitude modulated wave.

Such a reconnection of the transmitter may be effected by moving the blades of the switch 47 to the upper position, in which audio signals from the microphone 42 are caused to vary the frequency of oscillations in the tuned circuit 10 in response to the intensity of the signals. With this reconnection, no signal voltage is applied across the resistance 105, with the result that a constant current flows through the anode and cathode of the electron discharge device 80, so that oscillations in the tuned circuit 82, 83 are of constant frequency. Since the direction of transmission of radiation from the antenna 13 is adjusted in accordance with the intensity of oscillations in the tuned circuit 82, 83, the variation of the direction of transmission takes place cyclically at a constant frequency.

The means by which the audio signals from the microphone 42 are caused to vary the frequency of oscillations in the tuned circuit 10 comprises an electron discharge device 140, which is interconnected with the tuned circuit 10 in the same way as the electron discharge device 80 is interconnected with the tuned circuit 82, 83. The anode 141 of the device 140 is coupled through a coupling condenser 142 to the ungrounded terminal of the tuned circuit 10, and the cathode 143 is connected through a resistance 144, in shunt to a bypassing condenser 145, to ground, thereby being coupled to the grounded terminal of the tuned circuit 10. Voltage between the terminals of the tuned circuit 10 therefore appears between the anode 141 and the cathode 143, the device 140 being arranged to transmit a leading current through its anode and cathode.

The anode 141 of the device 140 is supplied with operating current through a choke coil 146 and a resistance 147 from the positive terminal of the source 22. The screen electrode 148 of the device 140 is connected through a resistance 150 to this positive terminal, and is bypassed to ground through a bypassing condenser 149.

A suitable phase shifting network applies an alternating potential to the control electrode 152 of the device 140, which potential is leading with respect to the alternating voltage between the anode 141 and the cathode 143. This network comprises a series combination of a condenser 151 and a resistance 153 connected in shunt to the tuned circuit 10. The control electrode 152 is connected to a point between the condenser 151 and the resistance 153. Alternating voltage between the terminals of the tuned circuit 10 appears across the series combination of condenser 151 and resistance 153, and produces a leading current flowing therethrough. This leading current produces a leading voltage across the resistance 153, which leading voltage appears between the control electrode 152 and the cathode 143. The leading voltage on the control electrode 152 in turn allows a current to flow between the anode 141 and the cathode 143, which current is leading with respect to the voltage across the terminals of the tuned circuit 10.

Since the discharge device 140 transmits leading current between its anode 141 and cathode 143 it simulates a condenser connected in shunt to the turned circuit 10, so that the tuned circuit resonates at a lower frequency. Adjustment of the average voltage across the resistance 153 determines the amount of alternating current flowing through the device 140, and in turn determines the apparent size of the condenser which is simulated, so that the resonant frequency of the tuned circuit 10 is thereby adjusted.

In the upward position of the switch 47, signals from the microphone 42, amplified through the amplifier 43 and transmitted through the transformer 44, are impressed, through the switch blades 45 and 46, between ground and a conductor 154, which is connected to the control electrode 152. The amount of leading alternating current flowing through the anode 141 and cathode 143 of the device 140 is therefore adjusted in response to the intensity of signals from the microphone 42, whereby the frequency of oscillations from the tuned circuit 10, and consequently the frequency of radiation from the antenna 13, is adjusted in response to the intensity of such signals.

As mentioned previously, the transmitter, when so connected, cyclically varies the direction of radiation from the antenna 13 up and down in a vertical plane at a constant frequency, and varies the frequency of such radiation in response to the intensity of signals from the microphone 42.

It is a common characteristic of all forms of my invention that the intensity of the radiated carrier wave is preferably maintained constant, while signals are transmitted by variation of a directional characteristic of the radiation, such as variation of the direction of propagation of a beam, or variation of the axis of polarization of the radiation. By maintaining the carrier wave intensity constant, it is assured that a maximum amount of radiation is received at the receiver at all times. The vagaries of reflection from the upper strata of the atmosphere produce a minimum correspondence between variations of the reflection coefficient and variation of the intensity of the radiation with resulting distortion of signal, when such signals are transmitted by variation of a directional characteristic of the wave rather than variation of its intensity. The limiter device illustrated in Fig. 3 is useful in aiding in the reduction of variation of intensity of received signals due to such varying reflection from the upper atmosphere.

In Fig. 4, there is illustrated a radio transmitter which alters the axis of polarization of radiation between vertical and horizontal planes in response to a function of the intensity of a signal. In this figure, a carrier wave generator 160 transmits oscillations through two electron discharge devices 161 and 162, respectively to a pair of antennae 163 and 164. The antenna 163 is arranged to radiate vertically polarized radio waves, while the antenna 164 is arranged to radiate horizontally polarized waves. Suitable means including an audio amplifier 165 is provided to make the electron discharge devices 161 and 162 alternately conductive in response to the intensity of signals from a microphone 166.

Oscillations from the carrier wave generator 160 are transmitted through a tuned transformer 167 to the control circuit of the discharge device 161, which circuit may be traced from the control electrode 168 through the tuned secondary of the transformer 167, a resistance 169 in shunt to a bypassing condenser 170, and a source 171 of bias potential to the cathode 172 of the device 161. The output circuit of the device 161 may be traced from the anode 173 through a tuned transformer 174 which is coupled to the antenna 163, and a source 175 of operating potential to the cathode 172.

Oscillations from the carrier wave generator 160 are similarly transferred to the input circuit of the discharge device 162 through a tuned transformer 176. The input circuit of the device 162 may be traced from the control electrode 177 through the secondary of the tuned transformer 176, a resistance 178 in shunt to a bypassing condenser 179, and the source 171 of potential to the cathode 180 of the device 162. The output circuit of the device 162 may be traced from the anode 181 through a tuned transformer 182 which is coupled to the antenna 164, and the source 175 of potential to the cathode 180.

Signals from the microphone 166 are amplified through the audio amplifier 165, whose output is in balanced, or push-pull, relation, and are applied across the resistances 169 and 178 in series. The condensers 170 and 179 have low reactance at the frequency of oscillations from the generator 160, but have substantial reactance at the highest frequency of signals from the microphone 166. An increasingly intense signal from the microphone 166 impresses an increasingly positive potential across one of the resistances 169 and 178, while impressing an increasingly negative potential across the other of the resistances. Such potentials, increasing in opposite polarity, make one of the electron discharge devices 161 and 162 more conductive, while making the other device less conductive. Consequently, oscillations from the generator 160 are transferred to the antennae 163 and 164 in relative amounts which are varied in response to the intensity of signals from the microphone 166.

Any receiver suitable for receiving amplitude modulated waves may be used with the transmitter of Fig. 4 if the accompanying receiving antenna is more effective to receive waves of one polarization than of another. Such an antenna may conveniently be formed, for example, by a straight conductor.

It is to be understood that it is within the scope of my invention to utilize modulation of more than one directional characteristic of the radiated wave, as, for example, to utilize modulation of a beam in both vertical and horizontal planes concurrently with modulation of the axis of polarization of the beam. Also, the amplitude or frequency of the carrier wave, if desired, may be modulated concurrently with modulation of any directional characteristic of the radiated wave, although it is preferred to maintain the amplitude of the wave constant. The transmitter of Fig. 4 may also be modified similarly to that of Fig. 1, so that the frequency of modulation of the plane of polarization of the wave is varied in response to the intensity of a signal, or alternatively at a constant frequency, while the carrier frequency is modulated in response to the signal. The receiver of Fig. 3 with a straight wire antenna is suitable for receiving such a signal in which the frequency of variation of the plane of polarization is varied in accordance with the intensity of the signal.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a radio transmitter, a radio receiver, said transmitter and receiver being so spaced that waves from said transmitter arrive at said receiver principally by reason of reflection from the higher strata of the atmosphere, means to radiate from said transmitter a wave of constant intensity and to modulate the direction of propagation of said wave at a frequency modulated in response to a desired signal, said frequency being substantially higher than the highest frequency of said signal, whereby said wave appears at the location of said receiver with modulations of intensity in accordance with a function of said desired signal, means in said receiver responsive to said modulations of intensity for producing a wave whose frequency corresponds to the frequency at which the direction of propagation of said wave is modulated, and means responsive to frequency variations of said last means for reproducing said signal.

2. In combination, a radio transmitter, a radio receiver, said receiver being so spaced from said transmitter that waves from said transmitter arrive at said receiver principally by reason of reflection from the higher strata of the atmosphere, means to radiate from said transmitter a wave of constant intensity and to modulate the plane of polarization of said wave at a frequency modulated in response to a desired signal, said frequency being substantially higher than the highest frequency of said signal, means for causing said receiver to receive said wave in greater intensity when polarized in one plane than when polarized in another plane, whereby said receiver receives said wave with modulations in intensity in accordance with a function of said signal and variations of reflection from said higher strata affect the received intensity in minimum amount, and means in said receiver responsive to said modulations in intensity for reproducing said signal.

3. In combination, a radio transmitter, a radio receiver, said receiver being spaced from said transmitter by sufficient distance that the path of transmission of waves between said transmitter and receiver may be adversely affected by disturbances to which said path is subject, means to radiate from said transmitter a wave having its plane of polarization modulated at a frequency modulated in response to a desired signal, said frequency being substantially higher than the highest frequency of said signal, means for causing said receiver to respond predominantly to said wave when polarized in a particular plane, whereby amplitude modulations of said wave caused by said disturbances produce minimum effect on said receiver and said receiver receives said wave with modulations of intensity in accordance with a function of said signal, and means in said receiver responsive to said modulations of intensity for reproducing said signal.

4. In a signal transmission system, a signal source, means for radiating a carrier wave, means for modulating the axis of polarization of said carrier wave at a frequency modulated in accordance with the intensity of said signal, and means responsive to modulations of the axis of polarization of said wave to receive said wave and reproduce said signal.

5. In a signal transmission system, a signal source, means for radiating a carrier wave, means for cyclically varying a directional characteristic of said wave at a predetermined frequency, means responsive to the intensity of a signal from said source for varying the frequency of cyclic variation of said characteristic, and means responsive to variation of the frequency of cyclic variation of the directional characteristic of said wave to receive said wave and reproduce said signal.

6. In a signal transmission system, a radio receiver comprising means to receive a carrier wave at different intensities as a cyclically varying directional characteristic thereof varies, the frequency of variation of said characteristic varying from a predetermined frequency in accordance with the intensity of a signal, means for detecting said received carrier wave to produce a voltage of which the intensity varies at a frequency corresponding to the frequency at which said directional characteristic varies, and means responsive to variations of the frequency of said voltage from said predetermined frequency to reproduce said signal.

7. In a signal transmission system, a radio receiver arranged to respond to a beam of radio waves sweeping past said receiver periodically, whereby said waves are received by said receiver with modulations of intensity, the frequency of sweep of said waves past said receiver varying from a predetermined frequency in accordance with the intensity of a signal, means in said receiver for detecting said waves to produce a voltage of which the intensity varies at a frequency corresponding to the frequency of sweep of said waves, and means responsive to variation of the frequency of said voltage from said predetermined frequency to reproduce said signal.

8. In a signal transmission system, a radio receiver arranged to respond to polarized radio waves impinging on said receiver with a varying axis of polarization, the frequency of variation of said axis varying from a predetermined frequency in accordance with the intensity of a signal, means responsive to variation of the axis of polarization of said waves for receiving said waves at different intensities as said axis of polarization varies, means in said receiver for detecting said received waves to produce a voltage of which the intensity varies at a frequency corresponding to the frequency at which said axis varies, and means responsive to variation of the frequency of said voltage from said predetermined frequency to reproduce said signal.

9. In a signal transmission system, a signal source, means for radiating a carrier wave of a predetermined frequency, means for varying a directional characteristic of said radiated carrier wave cyclically at a predetermined frequency, means responsive to the intensity of a signal from said source for modulating the frequency of cyclic variation of said directional characteristic, a receiver located at a position with respect to said radiating means where said carrier wave affects said receiver, means in said receiver for producing a wave whose frequency corresponds to the frequency of said cyclic variation, and means responsive to frequency variations of said last wave for reproducing said signal.

10. In a signal transmission system, a radio transmitter comprising a carrier wave source, a signal source, an antenna energized from said carrier wave source and arranged to radiate a carrier wave from said source, means for reflecting the radiated carrier wave in different directions, and means for adjusting said reflecting means to alter the direction of reflection of said carrier wave cyclically at a frequency modulated in accordance with a function of the intensity of a signal from said signal source.

11. In combination, a radiator, a reflector arranged to adjust the direction of propagation of waves radiated by said radiator in accordance with the tuning thereof, means responsive to waves received by said reflector from said radiator for adjusting said tuning, a signal source, and means to adjust said last means to vary said tuning in response to signals from said source.

12. In combination, a half wave dipole radiator, a dipole reflector arranged parallel to said radiator to adjust the direction of propagation of waves radiated from said radiator in accordance with the tuning thereof, means comprising a series resonant circuit connected between separated halves of said reflector to adjust the tuning thereof, and means to adjust the resonant frequency of said resonant circuit with respect to the frequency of said waves to vary the tuning of said reflector in response to signals to be transmitted.

13. In a signal transmission system, a signal source, a first wave source, means for radiating a second wave, means for modulating the plane of polarization of said second wave cyclically in response to the intensity of the wave from said first wave source, and means responsive to a function of the intensity of a signal from said signal source for modulating the frequency of one of said waves.

14. In a signal transmission system, a signal source, means for radiating a carrier wave, means for cyclically varying the plane of polarization of said wave at a predetermined frequency, and means responsive to the intensity of a signal from said source for varying the frequency of cyclic variation of said plane of polarization.

HALSEY W. KLINE.

REFERENCES CITED

The following references are of record in the file of this patent:

UNITED STATES PATENTS

| Number | Name | Date |
|---|---|---|
| 1,915,786 | Hammond, Jr. | June 27, 1933 |
| 1,874,979 | Hansell | Aug. 30, 1932 |
| 1,821,367 | Usselman | Sept. 1, 1931 |
| 1,667,792 | Martin | May 1, 1938 |
| 1,517,816 | Alexanderson | Dec. 2, 1924 |
| 2,051,537 | Wolff et al. | Aug. 18, 1936 |
| 1,841,654 | Korschenewsky | Jan. 19, 1932 |
| 1,915,782 | Hammond, Jr. | June 27, 1933 |
| 2,040,980 | De Bellescize | May 19, 1936 |
| 2,273,161 | Usselman | Feb. 17, 1942 |

FOREIGN PATENTS

| Number | Country | Date |
|---|---|---|
| 425,571 | Great Britain | Mar. 18, 1935 |